June 23, 1942.  T. M. BALL  2,287,593
CARBURETOR
Filed Feb. 5, 1940
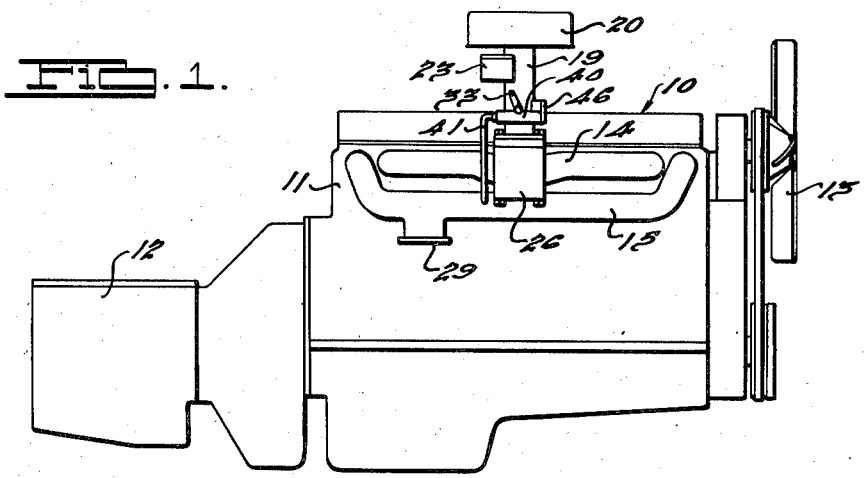
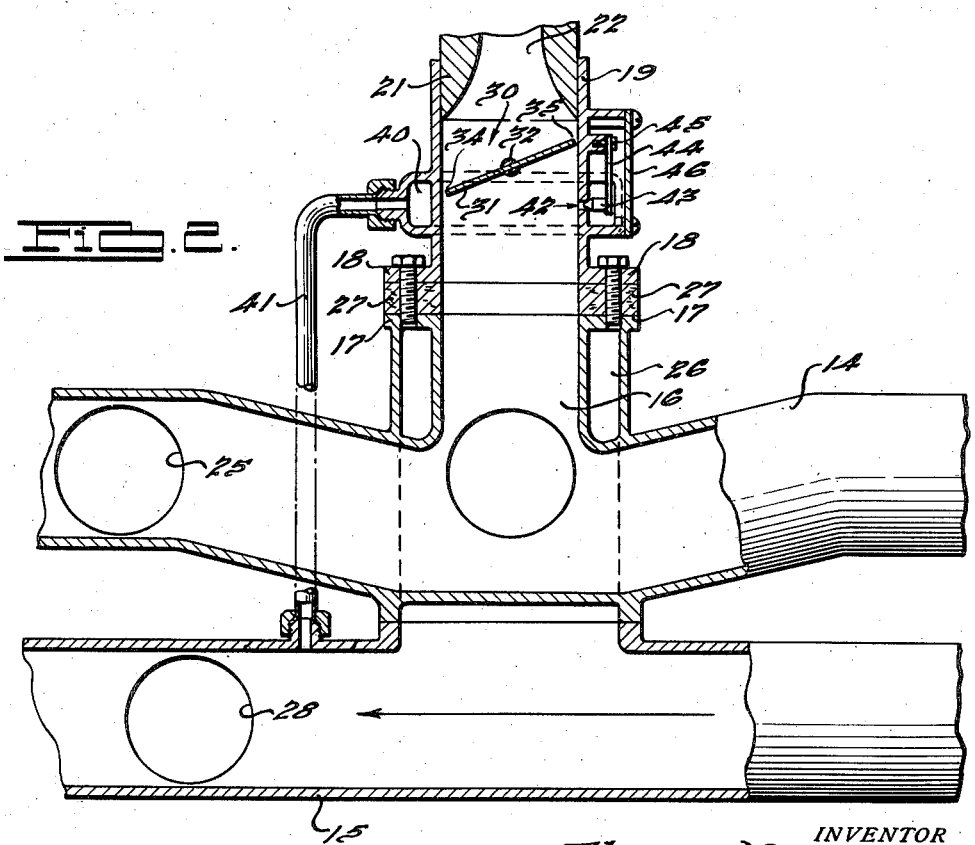
INVENTOR
Thomas M. Ball.
BY Harness, Dind, Pate & Harris.
ATTORNEYS.

Patented June 23, 1942

2,287,593

UNITED STATES PATENT OFFICE 2,287,593

CARBURETOR

Thomas M. Ball, Detroit, Mich., assignor to Ball & Ball Carburetor Company, Detroit, Mich., a partnership Application February 5, 1940, Serial No. 317,352

8 Claims. (Cl. 123—122)

The present invention relates to a means and method for preventing faulty carburetor operation during idling operation of an internal combustion engine of the carburetor type during the relatively short period of time subsequent to starting of the engine that the outer surface of the engine and the atmosphere immediately adjacent the engine remain cool or cold. It has been observed that shortly after starting an automotive engine the engine sometimes stalls when the carburetor is set at the idling position. This condition may continue until such time as the under-hood temperature rises to a predetermined extent, or until the outer surface of the engine has been heated to a considerable extent so as to cause a rise in temperature of the air surrounding the engine. This condition may exist on days when the temperature is well above the freezing point of water; nevertheless, it has been determined that the faulty operation during idling is due to the freezing of moisture in the air passing through the carburetor. During idling operation the throttle valve in the intake tube leading from the carburetor to the cylinders of the engine is set as such a position as to restrict the intake passage and from therein very small orifices through which a limited supply of fuel and air mixture may pass, the effect of such restrictions being to cause a rapid expansion of the mixture with an attendant drop in temperature adjacent the throttle valve orifices. On some days when the relative humidity of the atmosphere is within certain limits, even though the temperature may be above the freezing point of water, the rapid removal of heat from the region of the restrictions by the expansion of the fuel mixture causes the deposit of moisture in the form of drops of water and crystals of ice. If these products of condensation are permitted to remain at the restricting orifices the supply of combustible mixture may be diminished below that necessary to support combustion, or entirely cut off.

An object of the present invention is to prevent this phenomenon from occurring by rapidly heating the intake tube within the region of the throttle valve during the period immediately subsequent to starting of the engine and prior to warming of the engine. A further object of the present invention is to accomplish such heating by the use of normally wasted heat, specifically by passing a small quantity of exhaust gases from the engine in thermal exchange with the intake tube.

A further object of the present invention is to prevent the formation of products of condensation by mixing a small quantity of the exhaust gases from the engine with the fuel and air mixture passing through the intake tube near the orifices of the throttle valve, during the period subsequent to the starting of the engine and prior to warming of the engine.

A further object of the invention is to prevent the formation of products of condensation at the orifices of the throttle valve by heating the throttle valve by passing a limited amount of exhaust gases in thermal exchange with the intake tube near the throttle valve, and subsequently passing the exhaust gases which have been partially cooled by such thermal exchange into the intake tube near the throttle valve.

A further object of the present invention is to devise apparatus for the accomplishment of the foregoing objects which is inexpensive, of easy assembly and access for repair or inspection, and composed of a minimum of relatively simple and rugged parts.

The objects of the present invention will be more fully understood by referring to the accompanying specification and drawing describing and showing a preferred form of the invention. In the drawing, wherein like numerals refer to like parts throughout:

Fig. 1 discloses an internal combustion engine of the carburetor type having the present invention applied thereto; and, Fig. 2 is a vertical, sectional view on an enlarged scale taken substantially along a medial plane of the present invention and the associated parts of the internal combustion engine.

The present invention is shown as applied to a conventional automotive engine 10 comprising a cylinder block 11, transmission 12, fan 13, intake manifold 14, and exhaust manifold 15. The intake manifold 14 is provided with an inlet tube 16 having a flange 17 to which is bolted the flange 18 of an intake tube 19. The intake tube 19 extends into an air filter 20 through which air is drawn by the suction of the engine, and is provided with internal projections 21 forming a Venturi throat 22 for the purpose of creating a pressure differential for drawing liquid fuel from the carburetor 23. The liquid fuel sprays into the air in the region of the throat 22 and is eventually evaporated in and thoroughly mixed with the air, the mixture subsequently passing through the branches of the intake manifold 14 and into the individual connecting tubes 25 leading to the various cylinders of the engine. The exhaust manifold 15 is preferably provided with a heat exchanging extension 26 formed about the junction of the inlet tube 16 and the branches of the intake manifold 14 for the purpose of preheating the fuel mixture and assuring complete evaporation of all of the liquid fuel. The extension 26 terminates at the flange 17, and a gasket 27 is preferably interposed between the flanges 17 and 18 to prevent overheating of the carburetor 23 and associated parts of the intake mechanism. The products of combustion which are admitted to the exhaust manifold 15 through the individual outlets 28 from the cylinders of the engine are ejected through the manifold outlet 29.

The quantity of fuel and air mixture admitted to the cylinders, and hence the speed of the engine, is controlled by a throttle valve 30 consisting in the preferred form of a circular valve member 31 positioned in the intake tube 19, the valve member 31 being approximately of the same diameter as the internal diameter of the intake tube so that it would completely block the intake tube if positioned normal to the longitudinal axis thereof. The valve member 31 is mounted on a valve shaft 32 so that it may be moved to various angular positions upon operation of a crank 33 which is connected to various throttle valve controlling mechanisms (not shown), such as the hand throttle or foot throttle of a modern automotive engine. The angular position of the valve member 31 determines the sizes of the orifices 34 and 35 which the valve member forms with the walls of the intake tube 19.

The fuel and air mixture at the throat 22 of the intake venturi is not usually a perfect mixture, especially before the engine becomes warm, so that a quantity of minute drops of liquid fuel may pass through the orifices of the throttle valve. The expansion of the fuel and air mixture from its condition at the venturi to a more rarefied condition beyond the valve member 31 results in immediate evaporation of the fuel droplets, and the formation of ice or water at the orifices 34 and 35. It is possible that some condensation occurs in the Venturi throat 22 due to the evaporation of the entire fuel charge but the most intense cooling, in any event, occurs at the orifices 34 and 35, and it has been determined that the cooling at the region of these orifices is sufficient to cause ice formation.

In order to prevent such ice formation or the formation of any product of condensation in sufficient concentration to block the orifices of the throttle valve, I have devised means to heat the throttle valve during the first few minutes of operation. The preferred form of my invention comprises a chamber 40 surrounding the intake tube 19 in the region of the throttle valve and preferably having a wall in common with the intake tube. The chamber 40 is so formed as to be below the valve shaft 32 so as to permit ready insertion and removal of the shaft, and it has been determined that a chamber so positioned will operate satisfactorily since it is near enough to the throttle valve although, of course, the optimum position of the chamber would be such as to extend above and below the valve shaft 32. The chamber 40 is connected to a pipe 41 in open communication with the chamber 40 and with the interior of the exhaust manifold 15 so that if the chamber were open at any point a portion of the hot exhaust gases would rush through the chamber 40 and heat the throttle valve to an extent sufficient to prevent blocking thereof by products of condensation. In order to provide such an opening I have provided an escape valve 42 communicating between the chamber 40 and the interior of the intake tube 19 near the throttle valve, which valve comprises a hole drilled through the wall of the intake tube and a movable escape valve member 43 which when moved to open position permits passage of the exhaust gases through the opening into the interior of the intake tube. The valve member 43 is mounted on the free end of a thermostatic device consisting of a strip 44 of bimetallic material, the opposite end of which is held in fixed position by a bolt 45. The bimetallic strip is so designed as to hold the valve member 43 away from the valve opening when the engine is cold and to seat the valve member in the opening and hold it there when the engine has become warmed. The bimetallic strip is placed at a point remote from the connection of passageway 41 with the chamber 40 so that the gases will be cooled to the utmost extent by thermal exchange with the fuel mixture passing through the intake tube before reaching the strip, and the bolt 45 and a major portion of the strip are positioned in a relatively stagnant extension of the chamber 40 so that the strip will be as little affected by the exhaust gases as possible so as to delay closing of the escape valve as long as possible. The extension of chamber 40 within which bolt 45 is located is closed by a removable plate 46 so as to permit access to the bimetallic strip and the valve member.

The operation of the device is such that the escape valve 42 is open when the engine is cold. Immediately upon starting the engine a portion of the hot exhaust gases rushes through the chamber 40 and into the interior of the intake tube. The hot gases surrounding the throttle valve heat the walls thereof and pass into the intake tube below the throttle valve member 31. Even though the escape valve 42 is below the valve member 31, direct contact of the valve member 31 by warm exhaust gases is probable due to the eddy currents of the fuel mixture set up by the nature of the orifices 34 and 35 so that it is probable that further warming of the throttle valve by the admixture of the warm exhaust gases with the fuel mixture is accomplished. It is to be noticed that the orifice 34 is below the upper wall of the chamber 40 even though the valve shaft 32 is above the upper wall of chamber 40, since the opening direction of rotation of the valve shaft is counterclockwise and the usual carburetor adjustment members (not shown) prevent closing of the throttle valve beyond the approximate region illustrated in Fig. 2. Even though this causes the orifice 35 to be above the upper wall of chamber 40, it is probable that the greatest rush of the combustible mixture is through the orifice 34 so that immediate heating of the valve in the region of orifice 35 is not so important. Also it is to be noticed that the extension of chamber 40 within which bolt 45 is located extends beyond the orifice 35 so that some heating at the orifice 35 is accomplished even though the extension forms a relatively stagnant pocket. The gases which have been cooled by thermal exchange escape into the interior of the intake tube and, by reason of the eddy currents below the valve member 31, aid in heating the throttle valve member 31 so as to prevent accumulation of products of condensation thereon. The dilution of the fuel mixture by such exhaust gases is relatively unimportant, especially since it does not last for a long period of time and since it aids in preheating the fuel mixture during a period when the regular preheating device is least effective. The bimetallic member 44 has been so designed as to close the escape valve 42 at or about the time that the temperature of the atmosphere surrounding the engine is sufficient to warm the intake tube to an extent such that formation of restricting products of condensation will be prevented, and the chamber 40 immediately becomes stagnant and remains so until the engine again cools to a sufficient extent to permit valve 42 to open.

Having described and illustrated a preferred form of my invention, it should be apparent to those skilled in the art that the same permits of modifications in arrangement and detail. All such as come within the scope of the following claims are to be considered a part of my invention.

I claim:

1. In an internal combustion engine having a carburetor, a throttle valve for regulating the admission of fuel and air mixture to the engine, and an exhaust passage for conducting exhaust gases away from the engine, means for preventing accumulation of products of condensation at the orifices of said throttle valve during idling operation before the engine has become warm comprising a chamber surrounding said throttle valve and means for conducting exhaust gases from said exhaust passage into said chamber.

2. In an internal combustion engine having a carburetor, a throttle valve for regulating the admission of fuel and air mixture to the engine, and an exhaust passage for conducting exhaust gases away from the engine, means for preventing accumulation of products of condensation at the orifices of said throttle valve during idling operation before the engine has become warm comprising a chamber surrounding said throttle valve, means for conducting exhaust gases from said exhaust passage into said chamber, an escape valve which when open permits escape of exhaust gases from said chamber for rapid conduct of heat to the region of said throttle valve, and thermostatic means for operating said escape valve.

3. In an internal combustion engine having a carburetor, a throttle valve for regulating the admission of fuel and air mixture to the engine, and an exhaust passage for conducting exhaust gases away from the engine, means for preventing accumulation of products of condensation at the orifices of said throttle valve during idling operation before the engine has become warm comprising a chamber surrounding said throttle valve, means for conducting exhaust gases from said exhaust passage into said chamber, an escape valve which when open permits escape of exhaust gases from said chamber for rapid conduct of heat to the region of said throttle valve, and thermostatic means for operating said escape valve, said escape valve being so constructed and arranged as to conduct the partially cooled exhaust gases passing therethrough into the fuel and air mixture near said throttle valve.

4. In an internal combustion engine, an intake tube for conducting a combustible mixture to said engine, a throttle valve in said intake tube for regulating the flow of said mixture to the engine, an exhaust manifold for conducting exhaust gases away from said engine, and means to prevent restriction of said throttle valve by products of condensation comprising a chamber having a wall in common with said intake tube near said throttle valve, a passageway in open communication with said exhaust manifold and said chamber, an escape valve permitting communication between said chamber and said intake tube near said throttle valve when open, and thermostatic means in said chamber so arranged as to close said escape valve when heated to a predetermined extent.

5. In an internal combustion engine, an intake tube for conducting a combustible mixture to said engine, a throttle valve in said intake tube for regulating the flow of said mixture to the engine, an exhaust manifold for conducting exhaust gases away from said engine, and means to prevent restriction of said throttle valve by products of condensation comprising a chamber having a wall in common with said intake tube near said throttle valve, a passageway in open communication with said exhaust manifold and said chamber, an escape valve permitting communication between said chamber and said intake tube near said throttle valve when open, and a bimetallic element in said chamber so arranged as to close said escape valve when heated to a predetermined extent.

6. In an internal combustion engine, an intake tube for conducting a combustible mixture to said engine, a throttle valve in said intake tube for regulating the flow of said mixture to the engine, an exhaust manifold for conducting exhaust gases away from said engine, and means to prevent restriction of said throttle valve by products of condensation comprising a chamber having a wall in common with said intake tube near said throttle valve, a passageway in open communication with said exhaust manifold and said chamber, an escape valve permitting communication between said chamber and said intake tube near said throttle valve when open, and a bimetallic element in said chamber having one end fixed in position and the other end operatively connected to said escape valve, said element being so constructed and arranged as to close said escape valve when heated to a predetermined extent and to open said escape valve when cooled to a lower temperature.

7. In an internal combustion engine, an intake tube for conducting a combustible mixture to said engine, a throttle valve in said intake tube for regulating the flow of said mixture to the engine, said throttle valve comprising a valve member cooperating with said intake tube to form opposed orifices therewith, one of said orifices being at a higher level than the other of said orifices, an exhaust manifold for conducting exhaust gases away from said engine, and means to prevent restriction of said throttle valve orifices by products of condensation comprising a chamber having a wall in common with said intake tube and surrounding said intake tube adjacent the lower of said orifices, a passageway in open communication with said exhaust manifold and said chamber, an escape valve for said chamber permitting communication between said chamber and said intake tube opposite to and at substantially the same level as the lower of said orifices, an extension of said chamber forming a relatively stagnant space above said escape valve and extending to a point adjacent the higher of said orifices, and a bimetallic element extending into said extension and having an end fixed therein and its free end operatively associated with said escape valve.

8. In an internal combustion engine, an intake tube for conducting a combustible mixture to said engine, a throttle valve in said intake tube for regulating the flow of said mixture to the engine comprising a pivoted plate-like member peripherally engaging said intake tube when closed and providing inlet openings between the edge thereof and the inner surface of said intake tube when tilted away from closed position, an exhaust manifold for conducting exhaust gases away from said engine, and means to prevent restriction of said inlet openings by products of condensation during idling operation when the engine is cold comprising a chamber having a wall in common with said intake tube adjacent the periphery of said throttle valve, means to conduct a portion of the exhaust gases from said exhaust manifold through said chamber when the engine is cold, and an escape valve permitting communication between said chamber and said intake tube near said throttle valve when open.

THOMAS M. BALL.